(12) United States Patent
Toper

(10) Patent No.: US 11,165,730 B2
(45) Date of Patent: Nov. 2, 2021

(54) MESSAGE DELIVERABILITY MONITORING

(71) Applicant: Manycore Corporation, Walnut, CA (US)

(72) Inventor: Nicolas Toper, Walnut, CA (US)

(73) Assignee: Manycore Corporation, Walnut, CA (US)

( * ) Notice: Subject to any disclaimer, the term of this patent is extended or adjusted under 35 U.S.C. 154(b) by 0 days.

(21) Appl. No.: 16/919,082

(22) Filed: Jul. 1, 2020

(65) Prior Publication Data

US 2021/0044554 A1 Feb. 11, 2021

Related U.S. Application Data

(60) Provisional application No. 62/883,054, filed on Aug. 5, 2019.

(51) Int. Cl.
*H04L 12/58* (2006.01)
*G06N 3/08* (2006.01)

(52) U.S. Cl.
CPC .............. *H04L 51/12* (2013.01); *G06N 3/08* (2013.01)

(58) Field of Classification Search
CPC ..... H04L 51/12; H04L 51/22; H04L 63/1441; H04L 51/38; H04L 63/1408; H04L 51/32; H04L 51/00; H04L 51/08; H04L 51/10; H04L 63/1416; G06Q 10/107; H04W 4/14; G06N 20/00; G06N 3/08
See application file for complete search history.

(56) References Cited

U.S. PATENT DOCUMENTS

| | | | | |
|---|---|---|---|---|
| 8,001,156 B2* | 8/2011 | Hughes | ................. | G06F 40/143 707/802 |
| 8,676,815 B2* | 3/2014 | Deng | ...................... | G06F 16/93 707/749 |
| 10,565,233 B2* | 2/2020 | Deng | ...................... | G06F 16/35 |
| 2002/0010715 A1* | 1/2002 | Chinn | ........................ | G06F 3/16 715/236 |
| 2004/0210599 A1* | 10/2004 | Friedman | ............... | G06F 40/143 |
| 2007/0038705 A1* | 2/2007 | Chickering | ............. | H04L 51/12 709/206 |
| 2007/0112803 A1* | 5/2007 | Pettovello | ............. | G06F 16/134 |
| 2007/0127440 A1* | 6/2007 | Narayanaswami | ... | H04L 67/142 370/352 |
| 2008/0256117 A1* | 10/2008 | Laurila | ............... | H04L 65/1006 |

(Continued)

*Primary Examiner* — Ninos Donabed
(74) *Attorney, Agent, or Firm* — Cognition IP, P.C.; Edward Steakley

(57) ABSTRACT

Methods, systems, and devices are provided for detecting spam filtering. According to one aspect, the system can inject, by a server, into a client email campaign a plurality of emails for transmission to a plurality of seed email addresses separate from a plurality of non-injected emails of the client email campaign for transmission to a plurality of target email addresses. The system can detect whether the one or more injected emails were categorized as spam or not spam by each of the plurality of seed email addresses and generate a first input to an analysis module. The system can monitor a plurality of sensing signals from the non-injected emails and generate a second input to the analysis module. The analysis module can predict based on the first input and second input whether the non-injected emails are categorized as spam by the target email addresses.

7 Claims, 9 Drawing Sheets

(56) References Cited

U.S. PATENT DOCUMENTS

| | | | | |
|---|---|---|---|---|
| 2008/0289039 | A1* | 11/2008 | Rits | H04L 63/123 |
| | | | | 726/22 |
| 2009/0007253 | A1* | 1/2009 | Chung | H04L 67/02 |
| | | | | 726/12 |
| 2009/0177669 | A1* | 7/2009 | Ramarao | G06F 40/143 |
| 2010/0306249 | A1* | 12/2010 | Hill | G06Q 50/01 |
| | | | | 707/769 |
| 2012/0254333 | A1* | 10/2012 | Chandramouli | G06N 5/04 |
| | | | | 709/206 |
| 2013/0275522 | A1* | 10/2013 | Dillingham | H04L 51/34 |
| | | | | 709/206 |
| 2014/0004892 | A1* | 1/2014 | Murynets | H04M 3/2218 |
| | | | | 455/466 |
| 2016/0014094 | A1* | 1/2016 | Kurabayashi | H04L 51/046 |
| | | | | 726/26 |
| 2018/0083903 | A1* | 3/2018 | El-Alfy | H04W 4/14 |
| 2018/0159808 | A1* | 6/2018 | Pal | H04L 51/12 |

* cited by examiner

MESSAGE DELIVERABILITY MONITORING

BACKGROUND

Billions of email messages are sent per day around the world. Many of these email messages are undesired messages due to bad actors who mass produce phishing or scam emails. Because communication through the internet is important, organizations have deployed spam filters to combat mass undesired email messages. However, because of the effort to automatically remove unwanted email messages, many legitimate emails, such as weekly newsletters, or targeted emails that are desirable, are often filtered as spam. Many common spam filters are fuzzy spam filters and use machine learning or statistical techniques to detect spam. These include Gmail, Outlook, and others.

There have been efforts to understand and determine when an email sent to a recipient is being filtered by the recipient email address into a spam folder or the inbox. However, the current process of determining whether a message has been automatically filtered, or bounced, by a spam filter is both manually intensive, slow, and inaccurate, especially when modern spam filters are capable of adapting to user behavior, such as engagement with messages.

A way to better improve the detection of emails being filtered as spam can improve the way organizations send messages.

BRIEF SUMMARY

The present disclosure relates generally to systems and methods for detecting spam filtering. In one aspect, a message deliverability detection system can be configured to predict whether messages are categorized as spam by recipient spam filters. According to one aspect, the system can establish a connection, by a server, to a client email campaign on an email service provider (ESP). The system can, in response to a start action, initiate deliverability monitoring. The system can inject, by the server, into the client email campaign a plurality of emails for transmission to a plurality of seed email addresses separate from a plurality of non-injected emails of the client email campaign for transmission to a plurality of target email addresses.

The system can receive, by the plurality of seed email addresses, the one or more injected emails. And the system can detect whether the one or more injected emails were categorized as spam or not spam by each of the plurality of seed email addresses and generating a first input to an analysis module. The analysis module may be a machine learning model, rule-based system, or other software or hardware module.

In one aspect, the system can monitor a plurality of sensing signals from the plurality of non-injected emails transmitted by the client email campaign, the plurality of signals including at least one of whether the non-injected email was opened, whether a link in the non-injected email was clicked, whether an unsubscribe request was received, the time the non-injected email was received, or a combination thereof. The system can generate, from the plurality of signals, a second input to the analysis module. The system can predict, by the analysis module, based on the first input and second input, whether the non-injected emails of the client email campaign are categorized as spam by the target email addresses. And the system can, in response to a stop action, stop deliverability monitoring.

In one aspect, the target email addresses can be hosted by a plurality of Internet Service Providers (ISPs) and a plurality of separate analysis modules are provided, wherein each analysis module is used to predict whether each ISP categorizes the non-injected emails as spam.

In one aspect, the system can predict, by the analysis module, a change in the categorization of the non-injected emails of the client email campaign as spam by the target email addresses over time.

In one aspect, the system can predict from the sensing signals of the non-injected emails over time, using the analysis module, a change in known ISPs (Internet Service Provider, i.e email host) spam categorisation for a client email campaign.

In one aspect, the system can send a plurality of reference emails to each the seed email addresses, the plurality of reference emails having a known rate of spam categorization. The system can detect whether the seed email addresses categorize the plurality of reference emails as spam at the same rate as the known rate of spam categorization within a threshold. In one aspect, the system can remove a seed email address from a seed set when it is determined that the seed email address does not categorize the plurality of reference emails as spam at the same rate as the known rate of spam categorization within the threshold.

In one aspect, one of the signals can be a signal associated with a read receipt. In one aspect, one of the signals can be signal associated with a bounce notification.

In one aspect, one of the signals can be a signal associated with a rejection of the delivery to the target recipient. In one aspect, one of the signals can be signal associated with a user associated with the target recipient.

In one aspect, the ESP can be an SMTP service provider or a SMTP server.

In one aspect, the system can execute the email campaign, detect, based on one or more sensing signals, whether the client email campaign has a low success rate, and generate a third input to the analysis module based on the low success rate.

In one aspect, the analysis module can be a machine learning model. In one aspect, the analysis module can be a recurrent neural network (RNN). In one aspect, the analysis module can include Bayesian filters. In one aspect, the analysis module is a Hidden Markov Model (HMM). In one aspect, the analysis module is a random forest. In one aspect, the analysis module may use a weighted combination of several different models, such as of the aforementioned types. In one aspect the analysis module can be a rule-based system.

In one aspect, a message deliverability detection system can be configured to predict whether messages are categorized as spam by recipient spam filters. According to one aspect, the system can establish a connection, by a server, to a client email campaign on an email service provider (ESP). The system can, in response to a start action, initiate deliverability monitoring. The system can inject, by the server, into the client email campaign a plurality of emails for transmission to a plurality of seed email addresses separate from a plurality of non-injected emails of the client email campaign for transmission to a plurality of target email addresses. The system can receive, by the plurality of seed email addresses, the one or more injected emails. And the system can detect whether the one or more injected emails were categorized as spam or not spam by each of the plurality of seed email addresses and generating a first input to an analysis module.

In one aspect, a spam classification detection system can be configured to identify whether a message is categorized as spam message. According to one aspect, the system can receive an original email comprising a plurality of headers and content. The system can create a first email by sanitizing the headers of the original email and transmitting, from an email domain with a good email reputation, the first email to an email address. The system can determine whether the first email is categorized as spam by the email address, and, when the first email is categorized as not spam, continuing with additional testing. The system can create a second email by sanitizing a plurality of the headers of the original email that are inserted by an email service provider and transmitting the second email to the email address. The system can determine whether the second email is categorized as spam by the email address, and, when the second email is categorized as not spam, continuing with additional testing. The system can create a third email by replacing a subject header and a from header of the original email with a reference subject header and a reference from header. The system can determine whether the third email is categorized as spam by the email address, and, when the third email is categorized as not spam, continuing with additional testing. The system can create a fourth email by replacing the content of the original email with a reference content. The system can determine whether the fourth email is categorized as spam by the email address, and, when the fourth email is categorized as not spam, continuing with additional testing.

In one aspect, the system can conduct and repeat the following steps until a stop condition is reached: the system can create a test email by selecting a subset of the content of the original email to include in the test email and transmitting the test email to the email address. The system can repeat the process with creating a subsequent test email including a different subset of the content of the first test email. The system can determine whether the subsequent test email is categorized as spam by the email address.

And in one aspect, the system can determine whether a portion of the content of the original email is causing the original email to be classified as spam.

In one aspect, the content of the original email comprises plain text.

In one aspect, the content of the original email comprises code in a markup language and further comprises, parsing the markup language into a tree and generating the test email by selecting a first subtree of the tree and converting the first subtree into markup language to create content for the test mail. In one aspect, the system can generate the subsequent test email by selecting a second subtree of the first subtree and converting the second subtree into markup language to create content for the test email. In one aspect, the markup language comprises Hypertext Markup Language (HTML).

In one aspect, the stop condition comprises identifying one or more sentences causing the original email to be classified as spam.

In one aspect, the stop condition comprises identifying one or more words causing the original email to be classified as spam.

In one aspect, the email address comprises a seed email address.

In one aspect, the system can test the seed email address with reference emails to determine whether the seed email account properly classifies the reference emails as spam.

And in one aspect, the system can suggest a modification to the original email causing it to not be classified as spam.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Illustrative embodiments are described with reference to the following figures.

DETAILED DESCRIPTION

Figure 1:
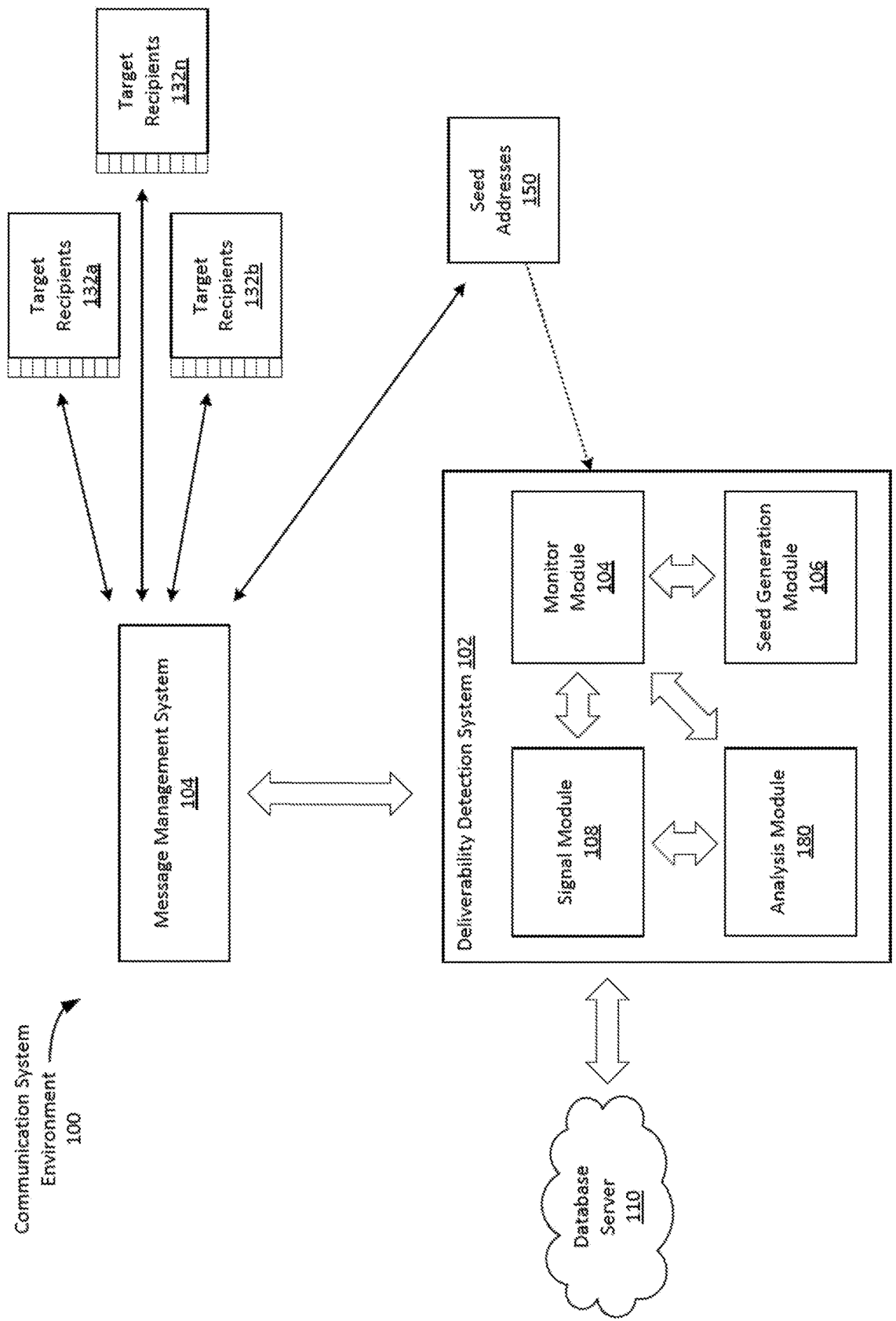
FIG. 1 illustrates an environment of a computer system for detecting spam filtering.

In this specification, reference is made in detail to specific embodiments of the invention. Some of the embodiments or their aspects are illustrated in the figures. For clarity in explanation, the system has been described with reference to specific embodiments, however it should be understood that the system is not limited to the described embodiments. On the contrary, the system covers alternatives, modifications, and equivalents as may be included within its scope as defined by any patent claims. The following embodiments of the system are set forth without any loss of generality to, and without imposing limitations on, the claimed method. In the following description, specific details are set forth in order to provide a thorough understanding of the present method. The present method may be practiced without some or all of these specific details. In addition, well known features may not have been described in detail to avoid unnecessarily obscuring the system.

In addition, it should be understood that steps of the exemplary system and method set forth in this patent can be performed in different orders than the order presented in this specification. Furthermore, some steps of the exemplary system and method may be performed in parallel rather than being performed sequentially.

A computer implemented system and method for detecting spam filtering is described below.

Typically, an organization with a large number of current or potential, customers, users, employees, etc., attempts to regularly communicate with the types of individuals to inform the individuals of opportunities, news, marketing information, or other information for wide dissemination. For example, a company with a large number of recurring customers may want to send marketing newsletters or deals to their customer base. This can be done by engaging in an email campaign for email users who are already subscribed to receive emails by the company. In this example, the company may use an email service provider (ESP), or directly send the email campaign with a mail server, to assist the company in sending one email to a mass quantity of users, typically users who are subscribers of the company's marketing campaigns.

However, due to the rise of spam filters and the improving sophistication of spam filters, deployed by email providers, such as Gmail, Outlook, Yahoo, etc., and deployed by internet service providers, such as AT&T, Verizon, that receive and relay email messages to the email providers. The spam filters deployed by the described organizations often filter marketing email campaigns. The spam filters can automatically determine whether a message should be labeled as spam based on the content of the message itself, or a user behavior which suggests that message of the same type or form should be filtered as spam.

The current method of determining whether an email campaign message is being filtered by recipient spam filters, either by all recipients, or by individual users or groups of users is both manually intensive and inaccurate. Additionally, spam filter detectors do not account for real time monitoring of spam filter behavior. For example, an email campaign may be successful for a few hours or days and may initially not be filtered as spam. However, due to user behaviors such as marking the email as spam or not opening the email, the spam filters may later categorize the email as spam and the success rate of the email campaign drops. However, current attempts at spam filter detection cannot account for the real time aspect to the problem, where the categorization as spam may change over time.

A. System for Detecting when Email is Classified as Spam

A system environment for detecting when an email is classified as spam by one or more recipient email addresses is described below.

FIG. 1 illustrates a system environment of a computer implemented system for monitoring email deliverability. Email deliverability may comprise determining whether an email was delivered to the inbox of the recipient or to a spam folder. This is distinct from email delivery, which is whether an email was delivered to the recipient's email address at all rather than bouncing. When the email is delivered to the recipient's email address, the email address provider, such as an Internet Service Provider (ISP), may include a spam filter that categorizes whether to place the email in the inbox or in a spam folder. The rate at which emails are categorized to the inbox is known as the inbox rate and the rate at which emails are categorized to spam may be referred to as the spam rate. Email deliverability may also comprise detecting whether an email is categorized into other folders, separate from the inbox, such as a "promotions" folder or "other" folder. These non-inbox folders are also associated with lower open rates than emails that arrive in the inbox and so may be considered to be spam-like folders. In one example, as illustrated in FIG. 1, a communication system environment 100 includes a deliverability detection system 102, configured to engage with a message management system 104 and target recipients. The deliverability detection system 102 can include a monitor module 104, a seed generation module 106, a signal module 108, and an analysis module 180. The deliverability detection system 102 is also configured to communicate, send, and retrieve information from a database server 110 that contains at least information relating to sensing signals for detecting whether a message has been classified as spam or moved to another spam-like folder by the spam filter. In one example, the deliverability detection system 102 may be stored in a web server in the cloud that can provide deliverability detection services upon request through an application programming interface (API). In some embodiments, the deliverability detection system is configurable through an interface, such as a web interface, on a computer system, such as a mobile device. In one example, the deliverability detection system 102 can apply to an email provider's "promotions" tab. The deliverability detection system and methods described above can be applied to detecting and predicting whether emails in email campaigns will be or have been categorized as "promotions", or "other"-type mail, and filtered to a promotions tab or a similar labelling automatically moving a message targeted for an inbox of an email provider to a different container or location.

In one example, the deliverability detection system 102 is configured to communicate with the message management system 104. The message management system 104 can be a messaging system configured to send and monitor messages. The message management system 104 can send a plurality of messages concurrently. The message management system 104 can include, for example, a mail transport agent (MTA) configured to send email or other messages to messaging recipients. For example, the mail transport agent (MTA) can send a plurality of emails, on behalf of a client or organization, to a plurality of email clients and monitor communications communication with the receiving computer systems configured to receive the messages. In another example, the message management system 104 can include, for example, an email service provider (ESP) configured to transmit a plurality of emails, or an email campaign, to a plurality of target recipients at each of their target email addresses. In one example, the message management system 104 can send email messages to email recipients via a simple mail transfer protocol (SMTP) connection with each target recipient devices for receiving the email messages. In one example, the message management system 104 can send email messages directly through a SMTP server. The message management system 104 may, for example, comprise one or more servers, including one or more SMTP servers.

In one example, when an email campaign is started or is ongoing, by a client email campaign, such that the message management system 104 is sending a plurality of emails associated with the email campaign, the deliverability detection system 102 can connect, communicate, and determine whether one or more emails sent in the email campaign is being labeled as spam email by recipients. The email campaign may be initiated by a client that is sending, for example, a marketing campaign or newsletter. The labelling can affect all of the target recipient email addresses, some of the target recipient email addresses, or groups of recipient email addresses. For example, different internet service providers (ISPs) or different email domains (Gmail, Outlook, Yahoo, etc.) may have different spam filters and categorize email as spam differently. In this example, the message management system 104 configured to send emails for a client email campaign, such as through an ESP, can send emails to target recipients 132a, 132b, to 132n, depending on how many different target recipients are the target in the client email campaign. The email recipients, or target recipients 132a, 132b, to 132n, can be ISP's or email host providers. In this example, each of the target recipients 132a to 132n can include its own spam filter. The deliverability detection system 102 can detect that the email campaign is sending emails to different target recipients 132n and identify that each of the different target recipients 132n can have a different spam filters that can behave differently from each other. The target recipients are hosted by a plurality of ISPs.

For example, at the start of a client email campaign on an ESP by the message management system 104, the deliverability detection system can establish a connection and inject one or more seed emails for testing whether emails are becoming labelled as spam by spam filters. In this example, the spam filters can be algorithmic spam filters deployed by the ISP's that receive the emails transmitted by the ESP or the user email provider (Gmail, Outlook, etc.). Each of the different ISP's or user email providers, or both, that will receive emails from the client email campaign transmitted by the message management system 104 can include its own spam filter. When the deliverability detection system 102 has established a connection with the message management system, the deliverability detection system 102, via a seed generation module 106, can inject one or more seed emails along with the client email campaign. In some embodiments, the deliverability detection system 102 is triggered to begin monitoring deliverability by a start action and is triggered to stop monitoring deliverability by a stop action. In one example, the one or more seed emails can include a start email at a start of a spam filter detection and a stop email at an end of the spam filter detection. The start email may be injected by the deliverability detection system 102 for transmission by the message management system to a special start email address that is intended to receive only the start email. The start email address receives incoming emails and parses them to determine their contents. The content of the start email may content text or data indicating that it is a start email and identifying information about the email campaign that is starting. The start email address may parse and interpret this information and transmit a start message or signal to deliverability detection system 102 to indicate for it to begin deliverability detection for the identified email campaign. In another example, the start action is an API call that indicates the start of an email campaign and may start spam filter detection. The stop email may be injected by the deliverability detection system 102 for transmission by the message management system to a special stop email address that is intended to receive only the stop email. The stop email address receives incoming emails and parses them to determine their contents. The content of the stop email may content text or data indicating that it is a stop email and identifying information about the email campaign that is ending. The stop email address may parse and interpret this information and transmit a stop message or signal to deliverability detection system 102 to indicate for it to stop deliverability detection for the identified email campaign. In some embodiments, there is no stop action. Instead, the deliverability detection system 102 may stop deliverability detection for the identified email campaign based on the expiration of a time limit, which may be set by the user.

In another example, a web request, such as via an API, or pressing a button can trigger a start of deliverability detection. Likewise, a web request, such as via an API, or a pressing a button can trigger the stop of deliverability detection.

In one example, the deliverability detection system 102, via the monitor module 104 and seed generation module 106, can further inject into the client email campaign a plurality of emails for transmission to a plurality of seed email addresses, at the seed addresses 150, separate from a plurality of non-injected emails of the client email campaign, for transmission to a plurality of target email addresses. The emails can be injected by adding new emails to the existing email campaign that was created by the client. The injected emails can be added, for example, by adding them to the email campaign at the message management system 104 and being sent through an SMTP server or may be added to a stored email campaign in an ESP.

In an embodiment, after the start of the client email campaign, or during the client email campaign, the deliverability detection system 102 via the monitor module 104 can monitor the campaign in real time and determine whether the email in the client email campaign is becoming labeled as spam by a spam filter, even though at the start of the campaign, the email or emails in the client email campaign was not labelled as spam.

In one example, during the email campaign, one of the plurality of emails sent to the target email addresses may not be considered spam, and will be delivered to an inbox of the seed email address associated with a particular email provider or ISP. However, over time of the email campaign, the emails sent to the target recipients may become labeled as spam and filtered as spam. In this case, the deliverability detection system 102, via the monitor module 104 and seed generation module 106, will periodically and continuously send seed emails to the seed address 150 associated with the target recipient 132n. If one of the plurality of emails sent to the seed email address was not labelled as spam earlier, but now filtered as spam, the deliverability detection system 102 can determine that the target recipient's spam filter associate with same seed address in the email campaign is also now becoming filtered as spam. In one example, the continuously sent emails to the seed email addresses can be done periodically, once a few hours. In one example, the plurality of emails sent to the seed email address or email addresses can be determined based on the local time of the target recipient. In one example, the time intervals of sending the emails of the plurality of emails sent to the seed addresses are not constant. For example, more emails can be sent to the seed email address during the first few hours of the email campaign and fewer emails can be sent to the seed email addresses during a day or a few days after the email campaign.

In one example, an analysis module 180 is configured to receive inputs and predict whether the emails in the email campaign are being filtered as spam by the spam filters of the target recipients. In one example, the deliverability detection system 102 determines whether the seed email addresses 150 categorize the seed emails as spam or not and generates a first input to the analysis module 180 to predict whether the emails are categorized as spam by the target recipients 132a, 132b, to 132n. In one example, the analysis module can also predict a change in the categorization of the emails in the email campaign, or non-injected emails, as spam by the target email addresses over time.

In one example, the analysis module 180 may comprise a machine learning model. The machine learning model may comprise a neural network, feed forward neural network, multi-layer perceptron, convolutional neural network (CNN), recurrent neural network (RNN), Hidden Markov Model (HMM), support vector machine (SVM), regression, a random forest, a combination of the aforementioned methods, or other method. In other examples, the analysis module 180 may comprise a rule-based system, where a set of deterministic rules are coded into the software. The rule-based system may comprise hard-coded rules or configurable rules, which may be created in a programming language, natural language, or other specification. In some examples, the rules of the rule-based system may be created by experts and comprise an expert knowledge system.

In one example, if the client email campaign is sending emails to a plurality of ISPs and email providers, multiple analysis modules can be configured to account for each of the different plurality of ISPs and email providers hosting the sent emails by the message management system. Each of the separate analysis modules in the deliverability detection system 102 may be configured to predict whether each ISP or email provider categorizes the non-injected emails as spam. The separate analysis modules may comprise machine learning models that are each be trained on the data from a single ISP or email provider so that it detects only for that particular ISP or email provider whether the email has been classified as spam or not. Alternatively, the separate analysis modules may comprise rule-based systems that comprise different rules for each ISP or email provider to detect for that particular ISP or email provider whether the email has been classified as spam or not.

In one example, the deliverability detection system 102 may perform ongoing hygiene on the seed email addresses to ensure that they accurately predict whether target recipients will filter the emails as spam or not. The deliverability detection system 102 can send a plurality of reference emails to the seed email addresses, where the plurality of reference emails have a known rate of spam categorization by email addresses on the same ISP or email provider as the seed email addresses. The deliverability detection system 102 can detect whether the seed email addresses categorize the plurality of reference emails as spam at the same rate as the known rate of spam categorization within a threshold. And the deliverability detection system 102 can remove a seed email address from a seed set of email addresses as when it is determined that a seed email address does not categorize the plurality of reference emails as spam at the same rate as the known rate of spam categorization within the threshold. In this example, the deliverability detection system 102 can detect, by constantly monitoring the ratio of spam emails versus non-spam emails detected, whether a seed address is faulty.

In one example, the deliverability detection system 102, via the monitor module, can account for a low open rate based on the local time of the target recipient 132n's location. In this example, noisy data is minimized. For example, when a low open rate is detected, but the local time in a target recipients' location is past midnight, for example, 1 AM local time, it would make sense that the open rate is low. Thus, the deliverability detection system 102 can account for the time and not mistakenly determine that the low open rate is due to a spam filter no longer allowing users to see the email in the email campaign in the user's inbox. The data associated with the local time and open rate can also be used by the analysis module to better predict whether an email campaign is likely being filtered by a spam filter. In one example, based on the one or more sensing signals, the analysis module can detect a low open rate of emails based on a time interval when the first target email was sent to a later time.

In one example, the deliverability detection system 102 can determine whether email or emails in a client email campaign is being filtered by one or more spam filters via the signal module 108. In one example, information and inputs from the signal module 108 is fused with information and inputs from the monitor module 104 by the analysis module 180 for predicting, by one or more analysis modules whether the emails of the client email campaign are categorized as spam by the target email addresses. Analysis module 180 may use inputs from both the monitor module 104 and signal module 108 to determine whether email is being classified as spam.

Figure 2:
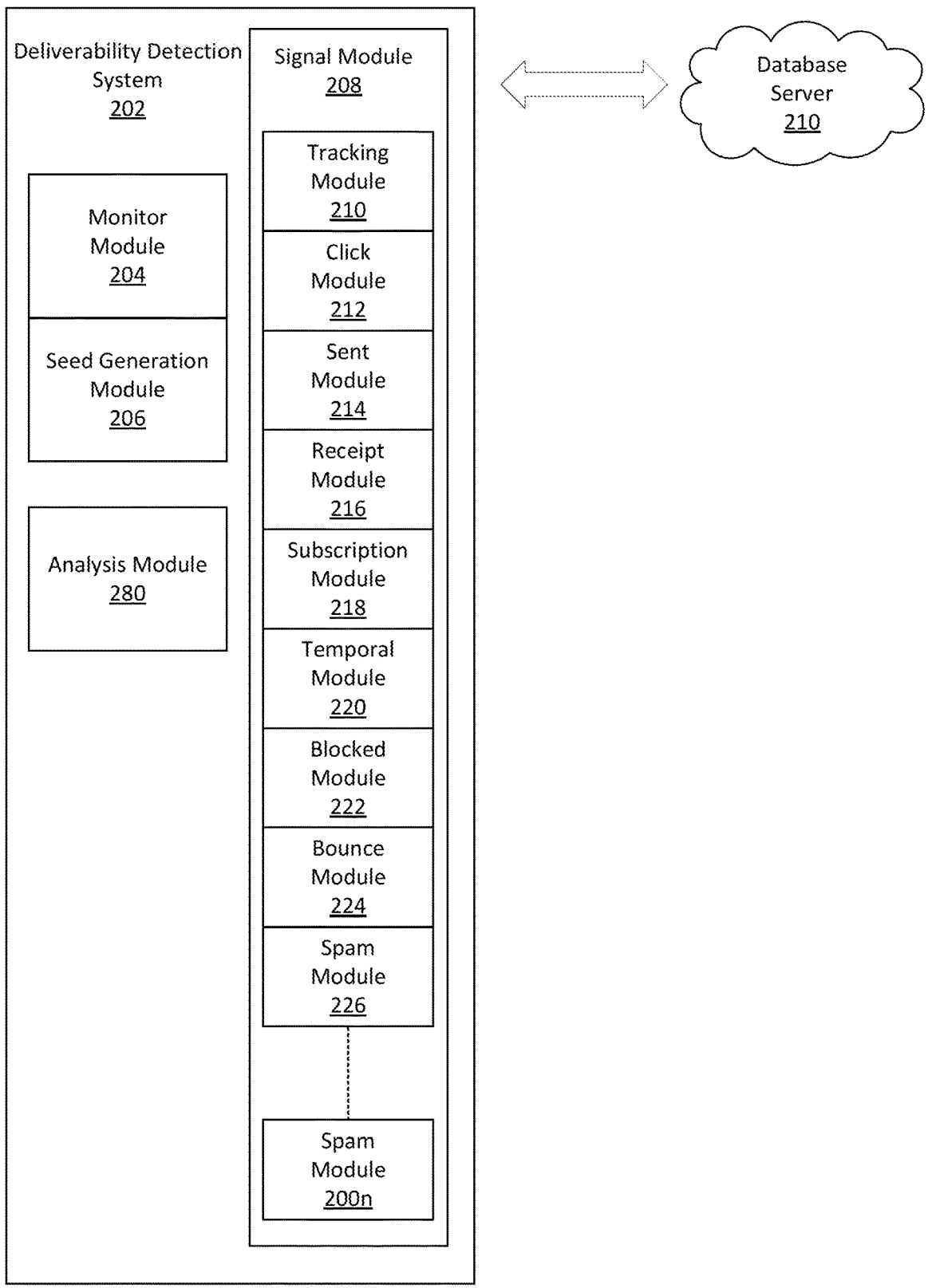
FIG. 2 shows a schematic illustration of a message deliverability detection system.

FIG. 2 illustrates a message deliverability detection system having a signal module similar to that of the deliverability detection system 102 in FIG. 1, in more detail. As illustrated in FIG. 2, a deliverability detection system 202 includes a monitor module 204, a seed generation module 206, and a signal module 208 having a plurality of modules associated with sensing signals. The sensing signals can be stored and retrieved via a database server 210, configured to store sensing data, to train one or more analysis modules and to be analyzed by an analysis module 280, of the deliverability detection system 202 to determine whether emails in an email campaign are being categorized as spam by spam filters associated with target email addresses.

The signal module 208 collects multiple signals from emails transmitted to the target recipients 132a, 132b, 132n to determine whether one or more emails in a client email campaign are being categorized as spam. In one example, the sensing signals can be gathered and collected by a tracking pixel in the email. The signals can be used by the deliverability detection system 202, via the signal module 208, to generate an input for an analysis module 280. The input received by the analysis module 280 from the signal module 208 can be combined with the input from the monitor module 204 (described above in FIG. 1) for one or more analysis modules of the deliverability detection system 202 to predict whether one or more emails of the client email campaign are categorized as spam. By using both the input from the monitor module 104 that is based on deliverability to the seed addresses 150 and the input from the signal module 108, which measures signals correlated with deliverability to the true target recipients 132a, 132b, 132n, the analysis module 180 may more accurately predict whether emails are being classified to the inboxes of the target recipients.

In one example, the sensing signals, including the tracking pixel can be generated, monitored, and tracked by a message management system, such as an ESP. The deliverability detection system 202 can receive the sensing signal data via a webhook or API.

In one example, the signal module 208 can receive and collect signals related to tracking via a tracking module 210. In one example, a click module 212 can determine when an email was clicked on or opened. The information from the clicks, such as click rate, time of most clicks, click frequency across an email campaign can be used to determine click ratio, IP address of the client performing the click and used as a signal to determine whether a drop in clicks is due to a spam filter categorizing emails as spam. Sent module 214 can determine when an email was sent. In some embodiments, the time at which an email was sent may be combined with another signal for determining whether an email might have been automatically flagged as spam. Receipt module 216 can detect and monitor read receipts, if any, and be used by the signal module 208. Having read receipts or lack of read receipts when a read receipt has been request can be used to determine whether an email was filtered by a spam filter. Subscription module 218 can receive signals related to number, frequency, and time of users unsubscribing from a subscription list used for the email campaign. Temporal module 220 can receive signals related to time such as, for example, the time of clicks, opens, unsubscribes, reads, and so on. Clicks, open rate, unsubscribe rate, read receipt, may be affected by the time of receipt. Blocked module 222 can receive signals indicating whether emails are being blocked by a target recipient. Bounce module 224 can receive signals to whether one or more emails in an email campaign have been bounced. This can include a soft bounce such as sending an email to a full mailbox or a hard bounce such as sending to a wrong address name. Spam module 226 can receive signals of a user manually moving a message to a spam folder. In one example, the spam module 226 can detect whether mail was reported as spam through feedback loops. For example, a user can manually drag a message to a spam folder without opening the message form the inbox. In this case, the spam filter would not have moved the message to spam, yet, neither the deliverability detection system 202 nor a message management system would detect a click. The information sensed by the signal module 208 can be used to increase accuracy. For example, when the deliverability detection system 202, via the monitor module 204 in monitoring the emails sent to seed addresses during the email campaign determines that the email is not going to spam yet, even though the click rate does not reflect the determination by the monitor module 204. Other sensing signals, such as a detection of a failed delivery email, can be used and fused by the signal module 208. Each of the aforementioned signals collected by the signal module 208 and is component modules 210, 212, 214, 216, 218, 220, 222, 224, 226, 200*n* may be used as signals input to the analysis module 280.

In one example, the deliverability detection system 102, based on the client email campaign, can determine whether the client email campaign has a low success rate, based on the spam to non-spam ratio determined. The deliverability detection system 102 can generate an input associated with the determination of a low success rate to an analysis module. The low success rate can be based on determining that emails are being filtered by a spam filter based on the time lapse of the email campaign, the content of the email, the signals from the sensing signals monitored, or a combination thereof.

In an embodiment, the analysis module 280 of FIG. 2 is the analysis module 180 of FIG. 1. The analysis module 280 may comprise a machine learning model. The machine learning model may comprise a neural network, feed forward neural network, multi-layer perceptron, convolutional neural network (CNN), recurrent neural network (RNN), Hidden Markov Model (HMM), support vector machine (SVM), regression, a combination of the aforementioned methods, or other method. The analysis module 280 may comprise a rule-based system, where a set of deterministic rules are coded into the software. The rule-based system may comprise hard-coded rules or configurable rules, which may be created in a programming language, natural language, or other specification. In some examples, the rules of the rule-based system may be created by experts and comprise an expert knowledge system.

Figure 3:
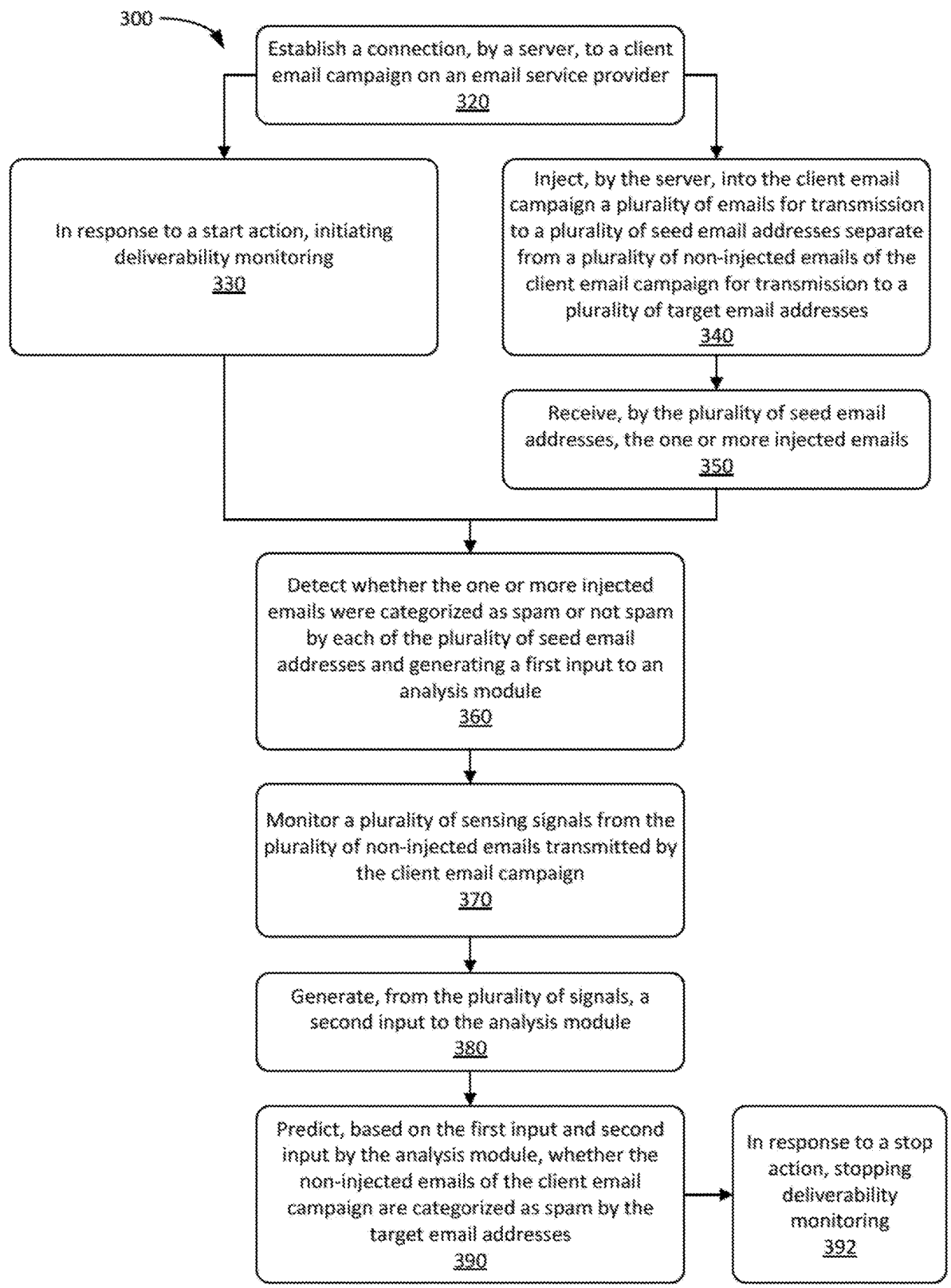
FIG. 3 illustrates a flow chart of an example process for detecting message deliverability in accordance with various aspects of the subject technology.
Figure 4:
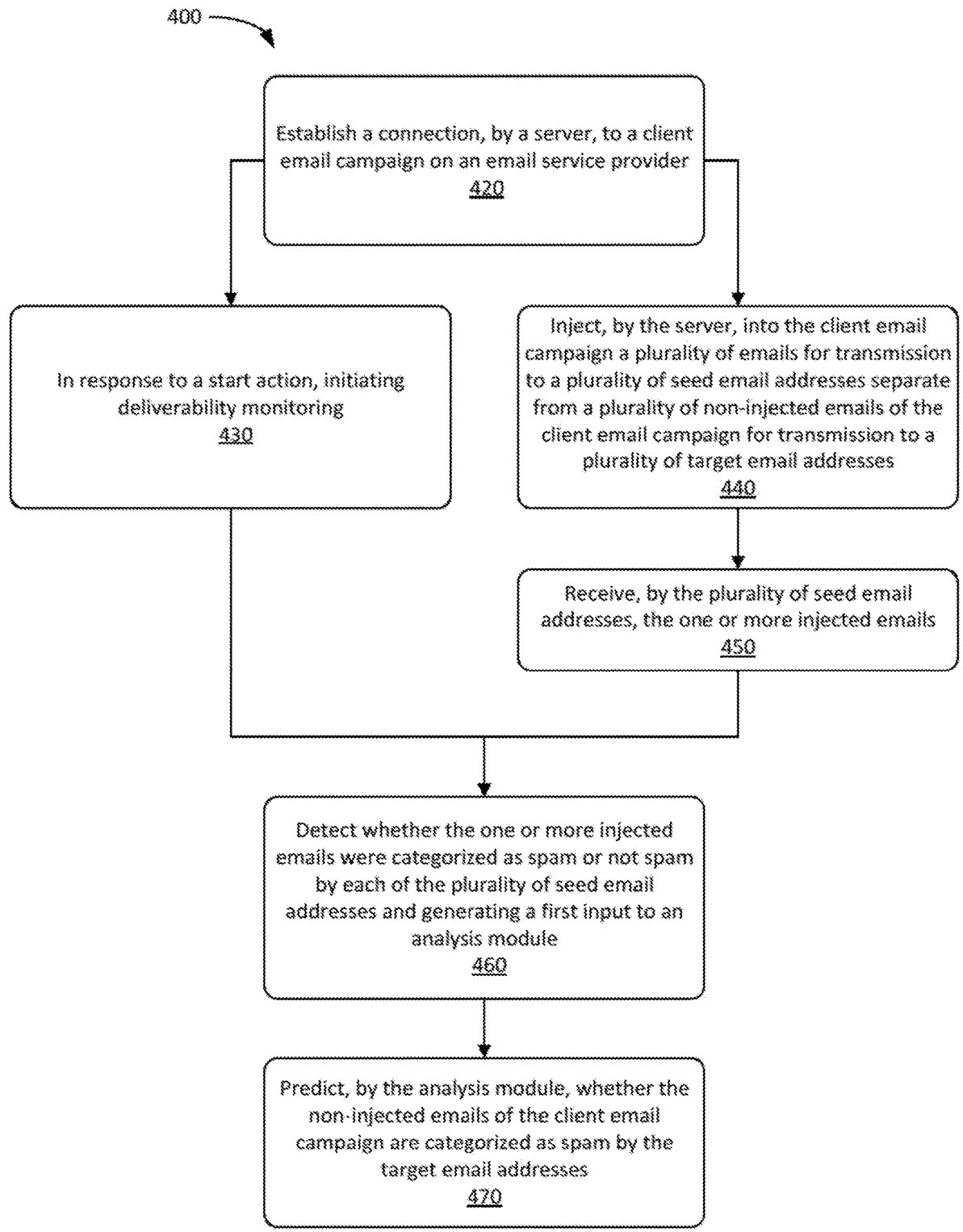
FIG. 4 illustrates an additional flow chart of an example process for detecting message deliverability in accordance with various aspects of the subject technology.
Figure 5:
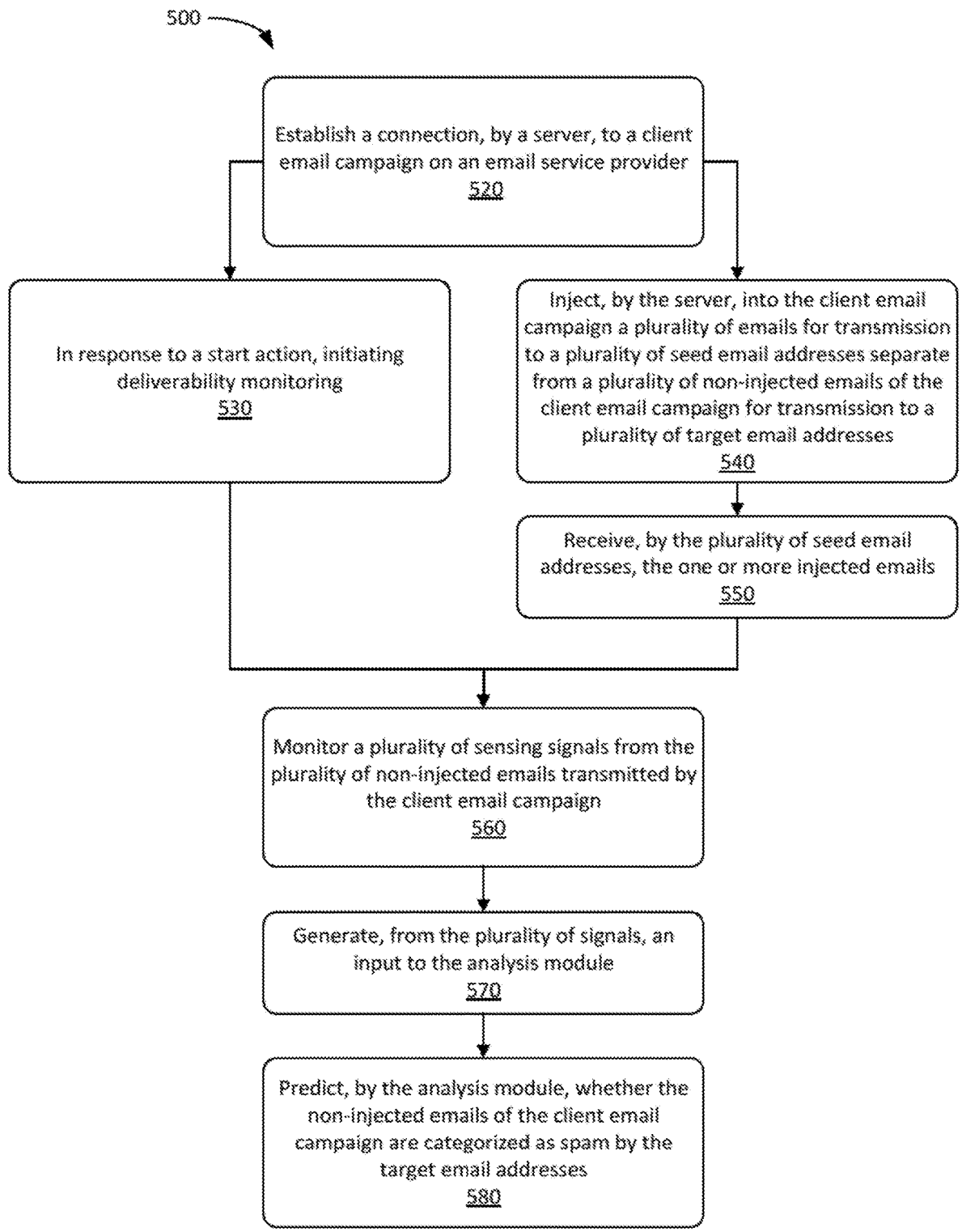
FIG. 5 illustrates an additional flow chart of an example process for detecting spam filtering in accordance with various aspects of the subject technology.

FIGS. 3-5 depicts flow diagrams of example processes for detecting spam filtering of one or more emails.

In the example flow diagram 300 of FIG. 3, at block 320, a computer-implemented system establishes a connection, by a server, to a client email campaign on an email service provider.

At block 330, the system can in response to a start action, initiate deliverability monitoring by the deliverability detection system. In some embodiments, this step may comprise injecting, by the server, into the client email campaign a start email at the start of deliverability detection and a stop email at the end of deliverability detection.

At block 340, the system can inject, by the server, into the client email campaign a plurality of emails for transmission to a plurality of seed email addresses separate from a plurality of non-injected emails of the client email campaign for transmission to a plurality of target email addresses.

At block 350, the system can receive, by the plurality of seed email addresses, the one or more injected emails.

At block 360, the system can detect whether the one or more injected emails were categorized as spam or not spam by each of the plurality of seed email addresses and generate a first input to an analysis module.

At block 370, the system can monitor a plurality of sensing signals from the plurality of non-injected emails transmitted by the client email campaign. The sensing signals can include at least one of whether the non-injected email was opened, whether a link in the non-injected email was clicked, whether an unsubscribe request was received, the time the non-injected email was received, or a combination thereof.

At block 380, the system can generate, from the plurality of signals, a second input to the analysis module.

At block 390, the system can predict, based on the first input and second input by the analysis module, whether the non-injected emails of the client email campaign are categorized as spam by the target email addresses.

And at block 392, the system can, in response to a stop action, stopping deliverability monitoring. The stop action may be a signal, or may be the result of the expiration of a time limit (e.g., timeout).

In the example flow diagram 400 of FIG. 4, at block 420, a computer-implemented system establish a connection, by a server, to a client email campaign on an email service provider.

At block 430, in response to a start action, initiate deliverability monitoring by the deliverability detection system. In some embodiments, this step may comprise injecting, by the server, into the client email campaign a start email at the start of deliverability detection and a stop email at the end of deliverability detection.

At block 440, the system can inject, by the server, into the client email campaign a plurality of emails for transmission to a plurality of seed email addresses separate from a plurality of non-injected emails of the client email campaign for transmission to a plurality of target email addresses.

At block 450, the system can receive, by the plurality of seed email addresses, the one or more injected emails.

At block 460, the system can detect whether the one or more injected emails were categorized as spam or not spam by each of the plurality of seed email addresses and generating a first input to an analysis module.

And at block 470, the system can predict, by the analysis module, whether the non-injected emails of the client email campaign are categorized as spam by the target email addresses.

In the example flow diagram 500 of FIG. 5, at block 520, a computer-implemented system establish a connection, by a server, to a client email campaign on an email service provider.

At block 530, in response to a start action, initiate deliverability monitoring by the deliverability detection system. In some embodiments, this step may comprise injecting, by the server, into the client email campaign a start email at the start of deliverability detection and a stop email at the end of deliverability detection.

At block 540, the system can inject, by the server, into the client email campaign a plurality of emails for transmission to a plurality of seed email addresses separate from a plurality of non-injected emails of the client email campaign for transmission to a plurality of target email addresses.

At block 550, the system can receive, by the plurality of seed email addresses, the one or more injected emails.

At block 560, the system can monitor a plurality of sensing signals from the plurality of non-injected emails transmitted by the client email campaign. The sensing signals can include at least one of whether the non-injected email was opened, whether a link in the non-injected email was clicked, whether an unsubscribe request was received, the time the non-injected email was received, or a combination thereof.

At block 570, the system can generate, from the plurality of signals, an input to the analysis module.

And at block 580, the system can predict, by the analysis module, whether the non-injected emails of the client email campaign are categorized as spam by the target email addresses.

In one example, the system can predict whether the non-injected emails of the client email campaign are categorized as spam by the target email addresses based on the first input and second input from that of the system described in FIG. 3 and that of FIG. 4. The combined use of signals obtained by monitoring seed email addresses by monitor module 204 and analytics signals from signal module 208 leads to more accurate detection of whether email is being delivered to recipients' spam folders. The combined signals may be collectively analyzed by analysis module 280.

B. System for Identifying Characteristics of Emails being Classified as Spam

A system environment for identifying when an email sent triggers a spam-filter to classify the sent email as spam is described below. Further, a computer-implemented system for detecting and identifying a portion of a message being triggered by a spam filter that classifies the message as spam is described below.

Figure 6:
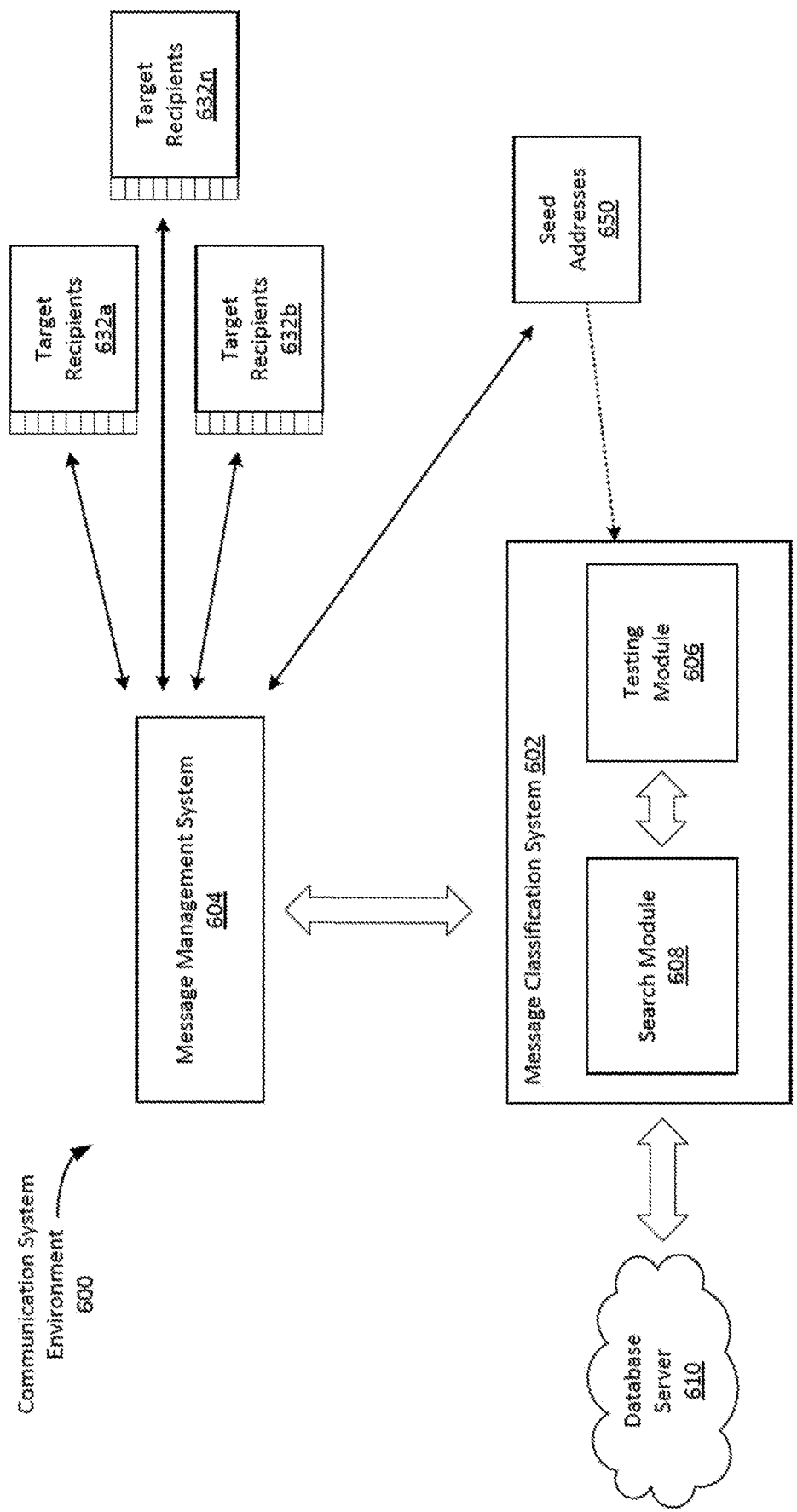
FIG. 6 illustrates an environment of a computer system for identifying an email triggering spam-filtering.

FIG. 6 illustrates a system environment of a computer-implemented system for identifying one or more emails triggering spam-filtering. Email deliverability may comprise determining whether an email was delivered to the inbox of the recipient or to a spam folder. This is distinct from email delivery, which is whether an email was delivered to the recipient's email address at all rather than bouncing. When the email is delivered to the recipient's email address, the email address provider, such as an Internet Service Provider (ISP), may include a spam filter that categorizes whether to place the email in the inbox or in a spam folder. The rate at which emails are categorized to the inbox is known as the inbox rate and the rate at which emails are categorized to spam may be referred to as the spam rate. Email deliverability may also comprise detecting whether an email is categorized into other folders, separate from the inbox, such as a "promotions" folder or "other" folder. These non-inbox folders are also associated with lower open rates than emails that arrive in the inbox and so may be considered to be spam-like folders. In one example, as illustrated in FIG. 6, a communication system environment 600 includes a message classification system 602, configured to engage with a message management system 604 and target recipients such as target recipients 632a, 632b, and 632n. The message classification system 602 can include a testing module 606 and a search module 608. The message classification system 602 is also configured to communicate, send, and retrieve information for a database server 610 that contains at least information relating to sensing signals for detecting which portions of a message have caused it to be classified as spam or moved to a spam-like folder by a spam filter, information relating to content of a plurality of email messages, information relating to content of a plurality of email headers and information related to email headers.

In one example, the message classification system 602 may be stored in a web server in the cloud that can provide deliverability detection services upon request through an application programing interface (API). In some embodiments, the message classification system is configurable through an interface, such as a web interface, on a computer system, such as a mobile device. In one example, the message classification system 602 can apply to an email provider's "promotions" tab. The message classification system and methods described above can be applied to detecting and predicting which parts of emails in email campaigns cause it to be categorized as "promotions", or "other"-type mail, and filtered to a promotions tab or a similar labelling automatically moving a message targeted for an inbox of an email provider to a different container or location.

The message classification system 602 may be used in conjunction with the deliverability detection system 102. In an embodiment, the deliverability detection system 102 may detect that one or more emails in an email campaign are being classified as spam. The message classification system 602 may then be used to analyze the email to determine what particular portions, such as header, portions of content (e.g., text, html, attachments), and so on are causing it to be classified as spam. In an embodiment, the deliverability detection system and message classification system 602 are both components of a single software program.

In one example, the message classification system 602 is configured to communicate with the message management system 604. The message management system 604 can be a messaging system configured to send and monitor messages. The message management system 604 can send a plurality of messages concurrently. The message management system 604 can include, for example, a mail transport agent (MTA) configured to send email or other messages to messaging recipients. For example, the MTA can send a plurality of emails, on behalf of a client or organization, to a plurality of email clients and monitor communications communication with the receiving computer systems configured to receive the messages. In another example, the message management system 604 can include, for example, an email service provider (ESP) configured to transmit a plurality of emails, or an email campaign, to a plurality of target recipients at each of their target email addresses. In one example, the message management system 604 can send email messages to email recipients via a simple mail transfer protocol (SMTP) connection with each target recipient devices for receiving the email messages. In one example, the message management system 104 can send email messages directly through a SMTP server. The message management system 604 may, for example, comprise one or more servers, including one or more SMTP servers.

In one example, the message classification system 602, through a plurality of interactions with the message management system 604, can identify whether an email sent by the message management system 604, or email sent by message classification system 602 is triggering a spam filter to classify the sent email as spam. The email, for example, can be an email sent in an email campaign. The email campaign may be initiated by a client that is sending, for example, a marketing campaign or newsletter.

The labelling, categorization, or classification can affect all of the target recipient email addresses, some of the target recipient email addresses, or groups of recipient email addresses. For example, different internet service providers (ISPs) or different email domains (Gmail, Outlook, Yahoo, etc.) may have different spam filters and categorize email as spam differently. In this example, the message management system 604 configured to send emails for a client email campaign, such as through an ESP, can send emails to target recipients 632a, 632b, to 632n, depending on how many different target recipients are the target in the client email campaign. The email recipients, or target recipients 632a, 632b, to 632n, can be ISP's or email host providers. In this example, each of the target recipients 632a to 632n can include its own spam filter. The message classification system 602 can detect that the email campaign is sending emails to different target recipients 632n and identify that each of the different target recipients 632n can have a different spam filters that can behave differently from each other.

In one example, the message classification system 602 can create one or more decision trees to determine whether an email in an email campaign is triggering a spam filter to classify the email as spam for that particular email address by the spam filter. In one example, depending on how many ISP's or email domains are detected by the message classification system 602, there can be a plurality of decision trees, one decision tree generated per unique spam filter detected. The number of decision trees can, for example, be generated by the number of ISP's or email domains detected.

In one example, message classification system 602 is configured to determine and identify the portion of an email causing it to be classified as spam by one or more spam filters by performing a search on the content of the email. In an embodiment, test emails are generated using a portion of the content of the email and the test emails are sent to seed email addresses to test if they are classified as spam or not. By determining, which of the test emails are sent to the spam folder it can be determined that the corresponding portion of the original email that was in the test email is causing the original email to be classified as spam. In order to minimize the number of test emails that must be sent, the creation of the test emails can be performed in a systematic manner. For example, a binary search approach may be taken where the original email may be divided into two parts (which may be equal or unequal in size) and each part included in a test email. When one part is found to be classified as spam, that part may be divided in two subparts and the two subparts may be sent in new test emails. The process may be repeated until a subpart of a desired size is found that is causing the original email to be classified as spam. In one example, the message classification system 602 is configured to determine and identify whether the emails or portions of emails that are being classified as spam through a minimum number of test emails as to identify the portion of the email that is causing it to be classified as spam.

In one example, the message classification system 602 can identify a portion of an email that is triggering spam filtering by a spam filter. The message classification system 602 can automatically remove, modify, or suggest a modification of the email as to remove or change the portion of the email that the message classification system 602 has determined is causing at least one spam filter to classify the email message as a spam message. In one example, the message classification system 602 can determine whether there are multiple portions of an email that is causing at least one spam filter to classify the email as a spam email.

In one example, the message classification system 602 is configured to create at least one decision tree to determine if an email message is triggering or will trigger a spam filter associated with an email address or ISP. For example, the message classification system 602 can receive an original message including a plurality of headers and content, such as that found in an email message. The email message may be, for example, an email of an email campaign that is found by deliverability detection system 102 to be classified as spam by target recipients 632a, 632b, 632n. The message classification system 602, via the testing module 606, can create a first email by sanitizing the headers of the original email and transmitting, from an email domain with a good reputation, the first email to an email address. The email address may be a seed address 650 that is under the control of the message classification system 602 or can be queried by the message classification system 602. The message classification system 602 can then determine whether the first email is categorized as spam by the email address. If the message is classified as spam, then the procedure may be stopped and the message classification system 602 may identify the problem as a DKIM, domain, or IP issue. If the message is not classified as spam, the message classification system 602 can further create a second email by sanitizing a plurality of the headers of the original email that are inserted by an email service provider and transmitting the second email to the email address. Generally, sanitizing a plurality of headers can include removing ESP or email domain specific headers. In one example, sanitizing a plurality of headers can include removing all headers except for the subject header, from header, or both. The message classification system 602 can then determine whether the second email is categorized as spam by the email address, and, when the second email is categorized as not spam, continuing with additional testing. If however, the message classification system 602 does determine that the second email is classified as spam, the message classification system 602 can determine that a portion of the original email message is being classified as spam by at least one spam filter. In this example, the portion of the original email message triggering spam filtering would be headers, such as ESP or email domain specific headers. If the message classification system 602 has determined that the first email and second email have not been categorized as spam, then the message classification system 602 can create a third email by replacing a subject header and a from header of the original email with a reference subject header and a reference from header. The subject header may contain the subject of the email and the from header may contain an identifier of the sender of the email. In one example, the cause of spam filtering comes from the content in the subject header, from header, or date header. The message classification system 602 can replace the subject header, from header, date header, or multiple headers with a clean value for compatibility with spam filters associated with ISPs. For example, if a date header contains with a date in the future, then an ISP's spam filter may mark the message with the particular date header as spam. The message classification system 602 would automatically change the header with a reference header that is compatible with the ISP. The message classification system 602 can then determine whether the third email is categorized as spam by the email address, and, when the third email is categorized as not spam, continuing with additional testing. However, if the first and second email were not classified as spam, but the third email was classified as spam, then the message classification system 602 can determine that either a subject header, from header, date header, or a combination thereof is the cause of triggering at least one spam filter. In one example, the message classification system 602 can create a fourth email by replacing the content of the original email with a reference content. The message classification system 602 can determine whether the fourth email is categorized as spam by the email address, and, when the fourth email is categorized as not spam, continuing with additional testing. Generally, the message classification system 602 can remove portions of content in a message, either text, images, or links, and replace portions of the content with clean content that has been tested with a good reputation, that is, the clean content is not being categorized as spam. If the first, second, third email, or a combination thereof, are not being categorized as spam, and the fourth email is not being categorized as spam, then the message classification system 602 can conclude that the replaced portion of content is triggering at least one spam filter.

In one example, the relationship between the content and information in the subject line or subject header can cause a spam filter to categorize the email as spam. In this example, the message classification system 602 can identify the relationship and remove, change, or recommend a change so that a spam filter would not categorize the email as spam based on the relationship between the content and one or more headers of the email. In one example, the test emails are sent to seed addresses 650 via the message management system 604.

In one example, the message classification system 602 can perform additional testing to determine if a portion of an email message is triggering at least one spam filter to classify the email message as spam.

Figure 9:
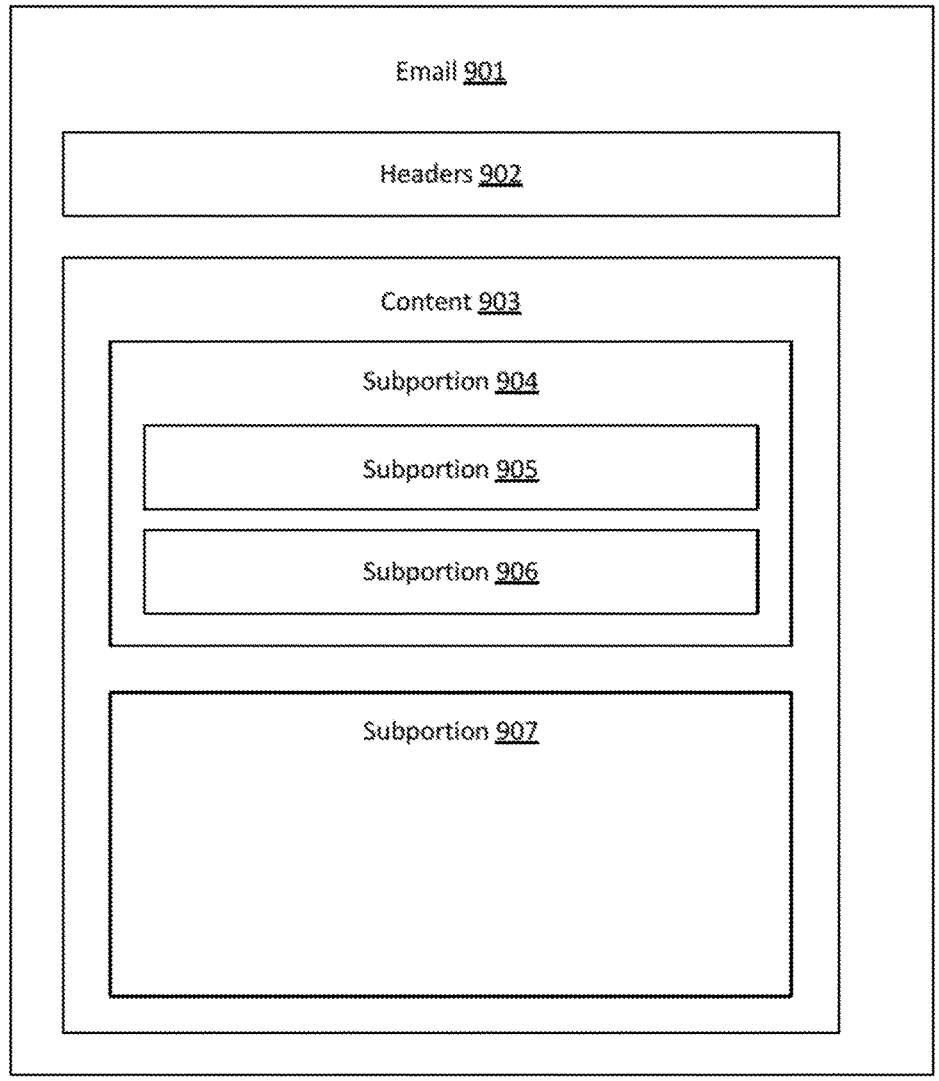
FIG. 9 illustrates an exemplary email with content divided into subportions to identify a subportion causing the classification as spam.

Taking from the previous example, if the message classification system 602 does not conclude that the fourth email is being categorized as spam, the message classification system 602 can conduct and repeat the following steps until a stop condition is reached. FIG. 9 illustrates an environment 900 with an email 901 where the steps are performed. Headers 902 have been tested and determined to not be a cause of spam classification by the steps above and therefore the content 903 is tested to determine if it is causing classification as spam. In one example, the stop condition can be determined based on the message classification system 602, via the testing module 606, determining that a portion of a subsequent test email, having different attributes from the first, second, third, or fourth email, is being categorized as spam. In one example, the stop condition includes identifying one or more sentences causing the original email to be classified as spam. In one example, the stop condition includes identifying one or more words causing the original email to be classified as spam. In one step, the message classification system 602 can create a first test email by selecting a subset of the content 904 of the original email to include in the first test email and transmitting the first test email to the email address. The message classification system 602 can determine whether the first test email is categorized as spam by the email address. If the first test email is determined to be categorized as spam by the email address, then the subset of content can be determined as the trigger for spam filtering. The process can be repeated by dividing the subset of content 904 further into one or more parts 905, 906 and creating a corresponding test email each containing one of the parts 905, 906. Each of the new test emails may be sent to the email address and determined to be spam or not. Any of the test emails classified as spam may be further divided until the stopping condition is reached at a desired level of granularity. If the first test email is not determined to be categorized by spam, then the content of the first test email (corresponding to subportion 904) can be eliminated from the process as not causing the classification as spam. The message classification system 602 can repeat the process by creating a subsequent test email including a different subset of content 907 from both the original email that is disjoint from the content of the first test email 904 (i.e., from a different portion of the original email). If then, the message classification system 602 determines that the subsequent test email is categorized as spam, then the different subset of content can be determined as the trigger for spam filtering. If the subsequent test email does not trigger a categorization of spam by at least one spam filter, then the process repeats with creating an additional subsequent email, and so forth. Each of the test emails may have sanitized headers, be sent from a domain with a good reputation, and optionally have a reference subject header and from header so that the only variable being tested is the email content.

The message classification system 602 can then determine whether a portion of the content of the original email is causing the original email to be classified as spam. And if the message classification system 602 does determine that a portion of the content of the original email is causing the original email to be classified as spam, the message classification system 602 can determine which portion based on the steps performed above.

In one embodiment, the content 903 and subportions 904, 905, 906, 907 are all plain text. The division of the content 903 into subportions may be made at white space such as spaces between sentence, at the end of sentences, at the end of paragraphs, and so on. In other embodiments, the content 903 is computer code in a markup language such as HTML. The markup language may have opening and closing tags. Dividing the content into subportions based on white space may not be an effective strategy due to potentially dividing the content in the middle of an opening and closing tag for an HTML (or other language) element.

When the content 903 is in a markup language with opening and closing tags, the message classification system 602 may parse the content 903 and create a tree representation of the content. Each node of the tree may represent a markup language element, represented by an opening and closing tag. The children of the node may represent the sub-elements (also defined by opening and closing tags) of the markup language element. The content 903 may be divided into subportions 904 and 907 by dividing it into two subtrees. The subtrees may be selected to be of roughly equal size, such as by number of nodes or amount of data, or may be selected to be of different sizes. The message classification system 602 may then convert the subtrees into markup language format. The corresponding markup language representing each subtree may be sent in a test email. In this way, the corresponding test emails may be created for subportions 904, 905, 906, 907.

In an embodiment, the message classification system 602 may operate on an email that has multiple parts, such as a text portion, a markup language portion, and an attachment. In an embodiment, a first step is performed of splitting the content into each of the separate parts (e.g., a text part, markup language part, and an attachment part) and sending each separately in a test email to the seed email address. When the seed email address determines that the test email address is not spam, then that part of the email can be eliminated as the portion causing classification as spam. When the seed email address determines that the test email address is spam, then the corresponding part of the email is determined to be the cause of the classification as spam. If the text portion is determined to be spam, then the particular part of the text portion that is causing classification as spam may be determined using the methods described elsewhere herein. If the markup language portion is determined to be spam, then the particular part of the markup language portion that is causing classification as spam may be determined using the methods described elsewhere herein. If the attachment is determined to be spam, then the message classification system 602 may flag that the attachment is causing the classification as spam. In an embodiment, the message classification system 602 displays a user interface with a display identifying which part of the content caused the classification as spam. The display may specifically identify which part of the text content or mark up language content caused the classification as spam.

In one example, a web request, such as via an API, or pressing a button can trigger a start of testing whether an email is being categorized as spam by at least one spam filter. Likewise, a web request, such as via an API, or a pressing a button can trigger the stop action.

In one example, the message classification system 602, via the search module 608, can determine whether an email message is triggering or will trigger a spam filter associated with an ISP or email address. In one example, the search module 608 can independently determine whether an email is being categorized by a spam filter and determine a portion of the email is triggering the spam filtering. In one example, the search module 608 can fine tune information received and analyzed by the testing module 606. For example, when the testing module 606 determines that it is at least a portion of content, such as a string, or strings, of text that is in the body of the email is causing spam filtering by a spam filter, the search module 608 can conduct a search algorithm or search function on the particular string, or strings, of text and determine which specific portion, sequence, etc. of the string of the text is causing a spam filter to categorize the email message as spam. In another example, if the testing module 606 determines that at least a series of headers is causing the email to trigger a spam filter, then the search module 608 can determine, for example, which header is causing spam filtering.

Figure 7:
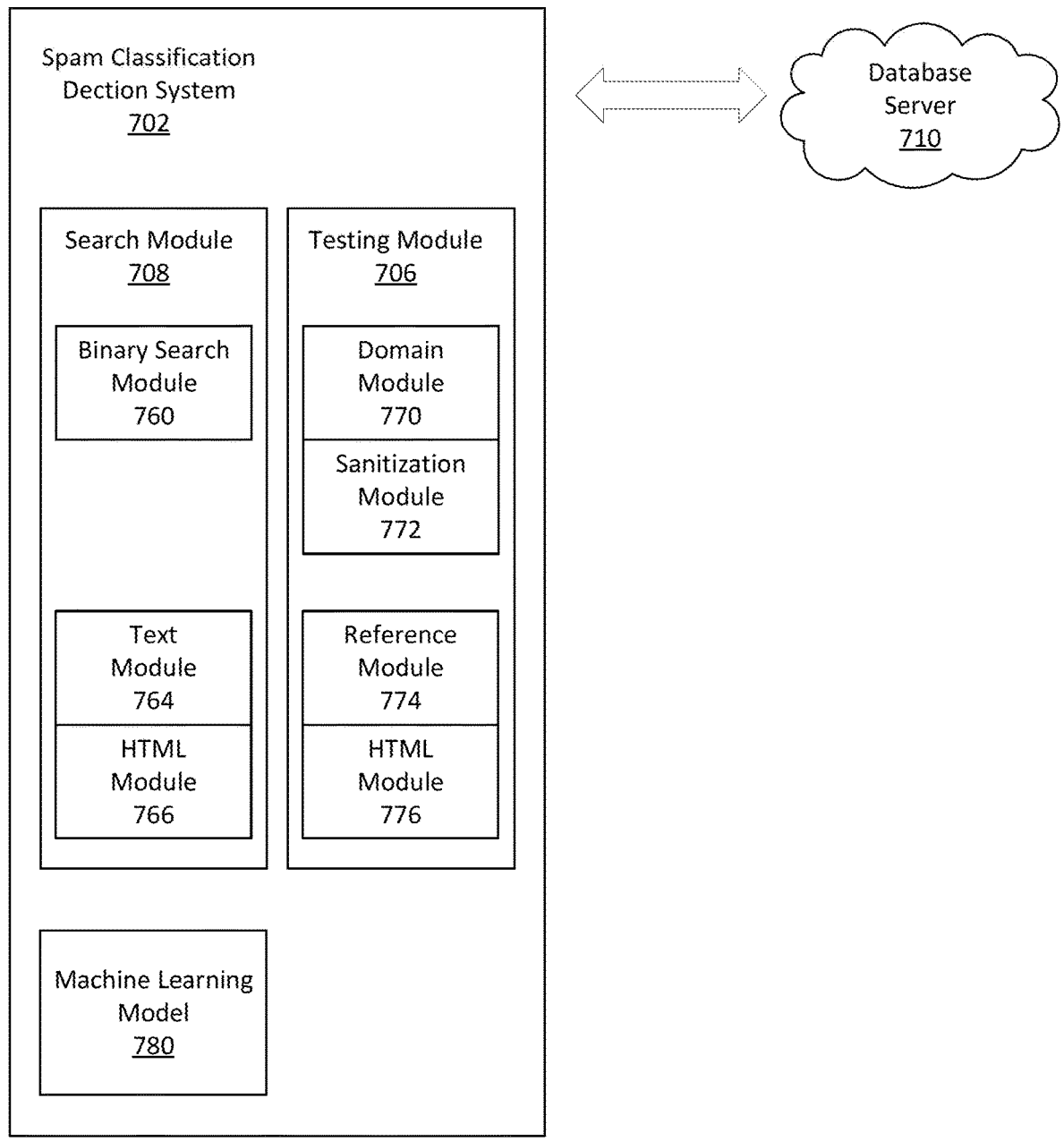
FIG. 7 shows a schematic illustration of a spam classification detection system.

FIG. 7 illustrates a spam classification detection system 702, similar to that of message classification system 602 of FIG. 1, in more detail. As illustrated in FIG. 2, a spam classification detection system 702 includes a testing module 706 and search module 708. The spam classification detection system 702 is also configured to communicate, send, and retrieve information for a database server 710 that contains at least information relating to sensing signals for detecting whether a message has been classified as spam or moved to a spam-like folder by a spam filter, information relating to content of a plurality of email messages, information relating to content of a plurality of email headers and information related to email headers. In one example, the testing module includes a domain module 770 and a sanitization module 772. The domain module 770 can be configured to create messages with a good reputation for testing. The sanitization module 772 can be configured to sanitize portions of a message to be tested as spam such as headers of an email message. Similar to that of the message classification system 602, the spam classification detection system 702 of FIG. 2 can create a test email and subsequent test emails associated with an original email to determine if the original email contains portions in the email that would trigger spam filtering by at least one spam filter. In one example, the test email or subsequent test email includes content replaced from the original email, via the reference module 774. In one example the test email or subsequent test email includes headers replaced or removed from the original email by reference headers, via the reference module 774. In one example the original email comprises plain test and the reference content also contains plain text. In one example, the content of the original email comprises code in a markup language. In one example, the markup language includes Hypertext Markup Language (HTML) and is generated by the HTML module 776. In one example, the spam classification detection system 702 can further parse the markup language into a tree and generate one or more test emails by selecting a first subtree of the tree and converting the first subtree into markup language to create content for the test email. In another example, the spam classification detection system 702 can further include generating the subsequent test email, if the first test email does not indicate a triggering of spam filtering, by selecting a second subtree of the first subtree and converting the second subtree into markup language to create content for the test email. In one example, an email address includes a seed email address. The spam classification detection system 702 can test the seed email address with reference emails, via the testing module 706, to determine whether the seed email address properly classifies the reference emails as spam or not spam.

In one example, the search module 708 includes a binary search module 760, a text module 764, and a HTML module 766. The search module 708 can independently determine whether an email is being categorized by a spam filter and determine a portion of the email is triggering the spam filtering. In one example, the search module 708 can fine tune information received and analyzed by the testing module 706. For example, when the testing module 706 determines that it is at least a portion of content, such as a string, or strings, of text that is in the body of the email is causing spam filtering by a spam filter, the search module 708 can conduct a search algorithm or search function on the particular string, or strings, of text and determine which specific portion, sequence, etc. of the string of the text is causing a spam filter to categorize the email message as spam. In another example, if the testing module 706 determines that at least a series of headers is causing the email to trigger a spam filter, then the search module 708 can determine, for example, which header is causing spam filtering. In one example, the search module 708 can determine one or more sentences as causing a trigger for spam filtering. In another example, the search module 708 can determine one or more words as causing a trigger for spam filtering. In one example, the search module 708 identifies spam filtering via a binary search conducted by the binary search module 760. The binary search can be conducted on text generated by the text module 764 or code in markup language, such as HTML by the HTML module 766. For example, the search module 708 can generate text, via the text module 764, from the content of the body of an original email. The search module 708, via the binary search module 760 can split the text in half and test a first one half of the text in a seed email to determine if the first one half of the text is a portion of the original email that would trigger at least one spam filter. If triggering a spam filter is not detected, then the binary search module 760 would test the other one half of the text of the original email in a seed address. The binary search module 760 can split the remaining one half of text that did trigger a spam filter into another halves and repeat the seed email testing until either strings of text, such as sentences, or individual words are identified as the trigger for spam filtering.

In one example, the spam classification detection system 702 can suggest a modification to the original email being tested and determined as spam a modified email of the original email to not be classified as spam. The spam classification detection system 702 can generate the suggestion based on information regarding the classification of spam based on both testing module 706 and the search module 708.

Figure 8:
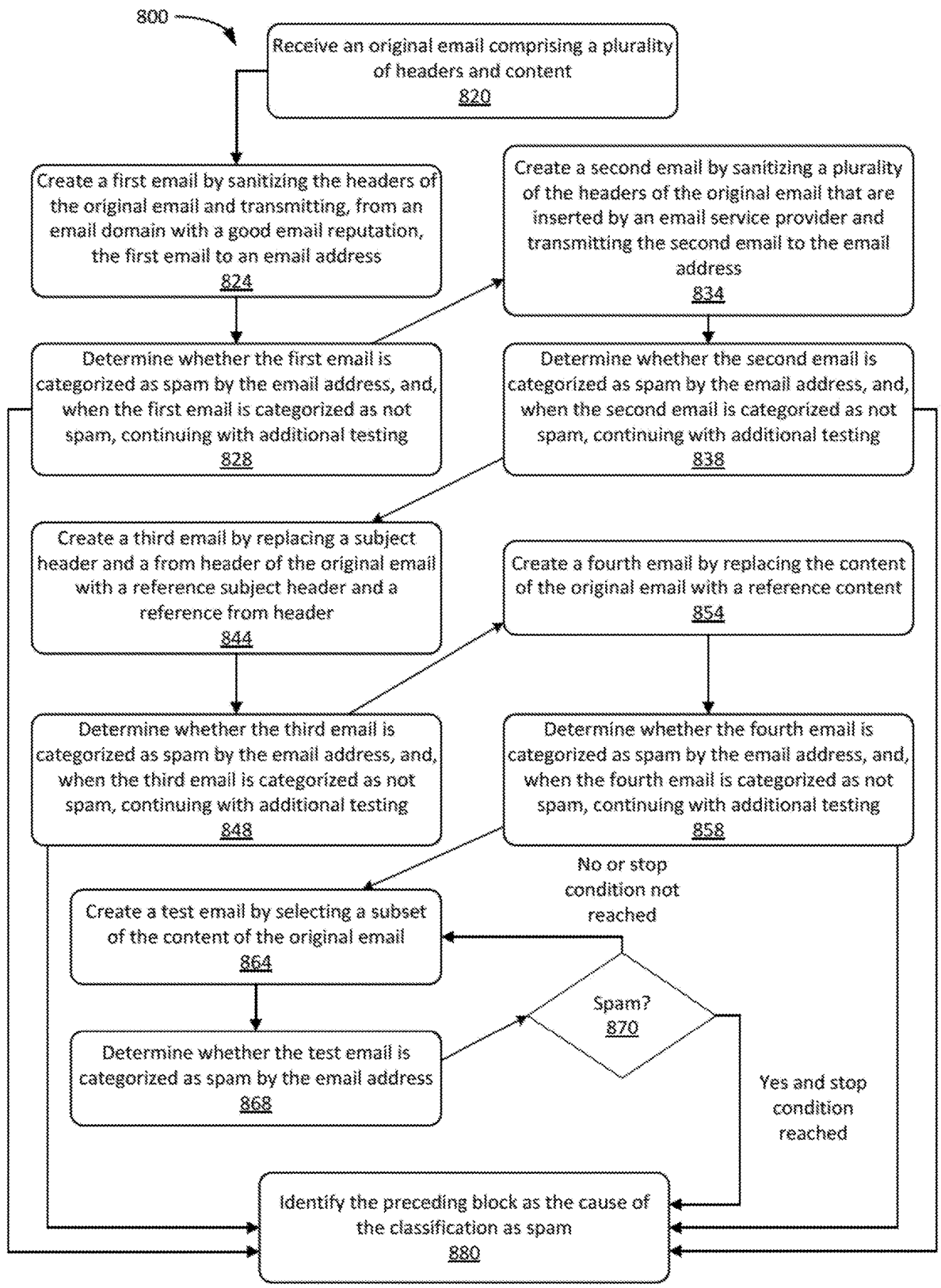
FIG. 8 illustrates a flow chart of an example process for identifying an email triggering spam-filtering in accordance with various aspects of the subject technology.

FIG. 8 depicts flow diagrams of example processes for identifying an email triggering spam-filtering.

In the example flow diagram 800 of FIG. 8, at block 820, a computer-implemented system can receive an original email comprising a plurality of headers and content.

At block 824, the system can create a first email by sanitizing the headers of the original email and transmitting, from an email domain with a good email reputation, the first email to an email address.

At block 828, the system can determine whether the first email is categorized as spam by the email address, and, when the first email is categorized as not spam, continuing with additional testing. If the system determines that the first email is categorized as spam, the system can conduct the next process at block 880.

At block 834, the system can create a second email by sanitizing a plurality of the headers of the original email that are inserted by an email service provider and transmitting the second email to the email address.

At block 838, the system can whether the second email is categorized as spam by the email address, and, when the second email is categorized as not spam, continuing with additional testing. If the system determines that the second email is categorized as spam, the system can conduct the next process at block 880.

At block 844, the system can a third email by replacing a subject header and a from header of the original email with a reference subject header and a reference from header.

At block 848, the system whether the third email is categorized as spam by the email address, and, when the third email is categorized as not spam, continuing with additional testing. If the system determines that the third email is categorized as spam, the system can conduct the next process at block 880.

At block 854, the system can create a fourth email by replacing the content of the original email with a reference content.

At block 858, the system can determine whether the fourth email is categorized as spam by the email address, and, when the fourth email is categorized as not spam, continuing with additional testing. If the system determines that the fourth email is categorized as spam, the system can conduct the next process at block 880.

At block 864, the system can create a test email by selecting a subset of the content of the original email.

At block 868, the system can determine whether the test email is categorized as spam by the email address.

At block 870, if determined that the test email created at block 864 is not spam, then the system can conduct process 864 and 868 until a subsequent test email created is categorized as spam the email address. If the system determines that the test email and of the subsequent test emails created is categorized as spam, the system can conduct the next process at block 880.

And at block 880, the system determines that the preceding block that caused the flow to block 880 was the cause of the email being classified as spam.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claims element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims s reflect, inventive subject matter lies in less than all features of a single disclosed configuration or operation. The following claims are hereby incorporated into the Detailed Description, with each claim standing on its own to represent separately claimed subject matter.

The claims are not intended to be limited to the aspects described herein but are to be accorded the full scope consistent with the language of the claims and to encompass all legal equivalents.

What is claimed is:

1. A computer-implemented method of identifying an email triggering spam-filtering, the method comprising:
   receiving an original email comprising a plurality of headers and content, the content comprising code in a markup language;
   creating a first email by sanitizing the headers of the original email and transmitting, from an email domain with a good email reputation, the first email to an email address;
   determining whether the first email is categorized as spam by the email address, and, when the first email is categorized as not spam, continuing with additional testing;
   creating a second email by sanitizing a plurality of the headers of the original email that are inserted by an email service provider and transmitting the second email to the email address;

determining whether the second email is categorized as spam by the email address, and, when the second email is categorized as not spam, continuing with additional testing;

creating a third email by replacing a subject header and a from header of the original email with a reference subject header and a reference from header;

determining whether the third email is categorized as spam by the email address, and, when the third email is categorized as not spam, continuing with additional testing;

creating a fourth email by replacing the content of the original email with a reference content;

determining whether the fourth email is categorized as spam by the email address, and, when the fourth email is categorized as not spam, continuing with additional testing;

conducting and repeating the following steps until a stop condition is reached, wherein reaching the stop condition comprises identifying one or more sentences from the original email causing the original email to be classified as spam;

wherein the conducting and repeating until the stop condition is reached comprises:

creating a first test email by selecting a subset of the content of the original email to include in the first test email and transmitting the first test email to the email address, wherein creating the first test email comprises:
(i) parsing the markup language of the original email into a tree;
(ii) generating the first test email by selecting a first subtree of the tree;
(iii) converting the first subtree into the markup language; and
(iv) creating content for the first test email based at least on the converted markup language in the first subtree;

determining whether the first test email is categorized as spam by the email address;

repeating the process with creating a subsequent test email including a different subset of the content of the first test email, wherein creating the subsequent test email comprises:
(i) selecting a second subtree of the first subtree;
(ii) converting the second subtree into the markup language; and
(iii) creating content for the subsequent test email based at least on the converted markup language in the second subtree;

determining whether the subsequent test email is categorized as spam by the email address; and determining whether a portion of the content of the original email is causing the original email to be classified as spam according to the stop condition.

2. The computer-implemented method of claim 1, wherein the content of the original email comprises plain text.

3. The computer-implemented method of claim 1, wherein the markup language comprises Hypertext Markup Language (HTML).

4. The computer-implemented method of claim 1, wherein the stop condition comprises identifying one or more words causing the original email to be classified as spam.

5. The computer-implemented method of claim 1, wherein the email address comprises a seed email address.

6. The computer-implemented method of claim 5, further comprising testing the seed email address with reference emails to determine whether the seed email address properly classifies the reference emails as spam.

7. The computer-implemented method of claim 1, further comprising suggesting a modification to the original email causing a modified email of the original email to not be classified as spam.

* * * * *